United States Patent
Roh et al.

(10) Patent No.: US 9,590,218 B2
(45) Date of Patent: Mar. 7, 2017

(54) RECHARGEABLE BATTERY

(71) Applicant: SAMSUNG SDI CO., LTD., Yongin-si, Gyeonggi-do (KR)

(72) Inventors: Sae-Weon Roh, Yongin-si (KR); Sung-Ho Song, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 446 days.

(21) Appl. No.: 14/074,887

(22) Filed: Nov. 8, 2013

(65) Prior Publication Data

US 2014/0212709 A1 Jul. 31, 2014

(30) Foreign Application Priority Data

Jan. 30, 2013 (KR) .................. 10-2013-0010719

(51) Int. Cl.
- *H01M 2/12* (2006.01)
- *H01M 2/02* (2006.01)
- *H01M 10/04* (2006.01)
- *H01M 2/04* (2006.01)

(52) U.S. Cl.
CPC ....... *H01M 2/1241* (2013.01); *H01M 2/0217* (2013.01); *H01M 2/0473* (2013.01); *H01M 10/0431* (2013.01)

(58) Field of Classification Search
CPC .... H01M 2/12; H01M 2/0217; H01M 2/1241; H01M 2/0473; H01M 10/0431
See application file for complete search history.

(56) References Cited

U.S. PATENT DOCUMENTS

| | | | |
|---|---|---|---|
| 2001/0012582 A1* | 8/2001 | Kim | H01M 2/06 429/184 |
| 2003/0077505 A1* | 4/2003 | Goda | H01M 2/0207 429/56 |
| 2003/0186113 A1* | 10/2003 | Hashimoto | H01M 2/06 429/94 |
| 2004/0131924 A1 | 7/2004 | Anglin et al. | |

(Continued)

FOREIGN PATENT DOCUMENTS

| EP | 1258931 A1 | 11/2002 |
|---|---|---|
| KR | 10-2005-0037691 | 4/2005 |

(Continued)

OTHER PUBLICATIONS

Korean Registration Determination Certificate dated Aug. 27, 2014.

(Continued)

*Primary Examiner* — Miriam Stagg
*Assistant Examiner* — Brian Ohara
(74) *Attorney, Agent, or Firm* — Lee & Morse, P.C.

(57) ABSTRACT

A rechargeable battery includes an electrode assembly including a first electrode plate, a second electrode plate, and a separator between the first electrode plate and the second electrode plate, a can having an opening at one side thereof through which the electrode assembly is inserted, the electrode assembly being accommodated in the inside of the can, and a cap plate that seals the opening of the can. The can includes a first vent on a first side surface of the can, and a second vent on a second side surface of the can.

16 Claims, 6 Drawing Sheets

(56) References Cited

U.S. PATENT DOCUMENTS

| | | | | |
|---|---|---|---|---|
| 2005/0181272 A1* | 8/2005 | Kim | ................. | H01M 2/0202 |
| | | | | 429/56 |
| 2007/0202393 A1* | 8/2007 | Hu | ................. | H01M 2/0469 |
| | | | | 429/53 |
| 2008/0070097 A1* | 3/2008 | Uh | ................. | H01M 2/0207 |
| | | | | 429/53 |
| 2009/0070097 A1* | 3/2009 | Wu | ................. | G06F 17/2223 |
| | | | | 704/2 |
| 2009/0075159 A1* | 3/2009 | Uh | ................. | H01M 2/1241 |
| | | | | 429/53 |
| 2009/0305114 A1* | 12/2009 | Yeo | ................. | H01M 2/0202 |
| | | | | 429/56 |
| 2011/0086243 A1* | 4/2011 | Bae | ................. | H01M 2/1022 |
| | | | | 429/7 |
| 2011/0117424 A1 | 5/2011 | Kim | | |
| 2011/0269013 A1* | 11/2011 | Yoon | ................. | H01M 2/1241 |
| | | | | 429/176 |

FOREIGN PATENT DOCUMENTS

| | | |
|---|---|---|
| KR | 10-2009-0127701 | 12/2009 |
| KR | 10-2011-0122050 A | 11/2011 |

OTHER PUBLICATIONS

Korean Office Action dated Jan. 29, 2014.
Extended European Search Report dated May 20, 2014.
European Examination Report dated Jul. 8, 2016.

* cited by examiner

RECHARGEABLE BATTERY

CROSS-REFERENCE TO RELATED APPLICATION

Korean Patent Application No. 10-2013-0010719, filed on Jan. 30, 2013, in the Korean Intellectual Property Office, and entitled: "Rechargeable Battery," is incorporated by reference herein in its entirety.

BACKGROUND

1. Field

Embodiments relate to a rechargeable battery.

2. Description of the Related Art

Secondary batteries can be charged or discharged, unlike primary batteries, which cannot be charged. Therefore, secondary batteries, i.e. rechargeable batteries are widely used in the field of compact, up-to-date electronic equipment such as mobile phones, personal digital assistants (PDAs), and laptop computers.

SUMMARY

Embodiments are directed to a rechargeable battery including an electrode assembly including a first electrode plate, a second electrode plate, and a separator between the first electrode plate and the second electrode plate, a can having an opening at one side thereof through which the electrode assembly is inserted, the electrode assembly being accommodated in the inside of the can, and a cap plate that seals the opening of the can. The can includes a first vent on a first side surface of the can, and a second vent on a second side surface of the can.

The first side surface of the can and the second side surface of the can may be located on opposite sides of the rechargeable batter from each other.

The first vent may be on a lower portion of the first side surface of the can. The second vent may be on an upper portion of the second side surface of the can.

The first vent and the second vent may be disposed away from each other.

The first vent and the second vent may each be in a form of a recess. A depth of the first vent may be deeper than a depth of the second vent.

The first vent may satisfy the following conditional inequality 1:

$$8.5\% < \frac{(t-d_1)}{t} < 25\%, \quad \langle\text{conditional inequality 1}\rangle$$

where d1 represents the depth of the first vent, and t represents a thickness of the can.

A maximum depth of the second vent may be about 0.5 times the depth of the first vent.

The depth of the first vent may satisfy the following conditional inequality 2:

$$0.03\ \text{mm} < t-d_1 < 0.07\ \text{mm}, \quad \langle\text{conditional inequality 2}\rangle$$

where d1 represents the depth of the first vent and t represents a thickness of the can.

Any one of the first vent and the second vent may extend along an oblique direction with respect to a thickness direction of the cap plate, and another one of the first vent and the second vent may extend parallel to the thickness direction of the cap plate or extends along a perpendicular direction with respect to the thickness direction of the cap plate.

Embodiments are also directed to a rechargeable battery including an electrode assembly including a first electrode plate, a second electrode plate, and a separator between the first electrode plate and the second electrode plate, a can formed of a metallic material and having an opening at one side thereof through which the electrode assembly is inserted, the electrode assembly being accommodated inside the can, and a cap plate that is welded to the can to seal the opening of the can. The can includes a first vent on a lower portion of a first side surface of the can, and a second vent on an upper portion of a second side surface of the can, the second side surface being on an opposite side of the can from the first side surface.

Embodiments are also directed to a rechargeable battery including an electrode assembly including a first electrode plate, a second electrode plate, and a separator between the first electrode plate and the second electrode plate, a can having an opening at one side thereof through which the electrode assembly is inserted, the electrode assembly being accommodated inside the can, and a cap plate that seals the opening of the can. The can includes a first side surface and a second side surface that extend in a thickness direction of the cap plate from a longer side portion of the cap plate, the first side surface and the second side surface facing in opposite directions from each other, a third side surface and a fourth side surface extend along the thickness direction of the cap plate from a shorter side portion of the cap plate, the third side surface and the fourth side surface facing in opposite directions from each other, a first vent on a lower portion of the first side surface, and a second vent on an upper portion of the second side surface.

The first vent may be on one side of the lower portion of the first side surface. The second vent may be on one side of the upper portion of the second side surface.

Any one of the first vent and the second vent may extend along an oblique direction with respect to the thickness direction of the cap plate, and another one of the first vent and the second vent may extend parallel to the thickness direction of the cap plate or extends along a perpendicular direction with respect to the thickness direction of the cap plate.

The first vent and the second vent may each be in a form of a recess. A depth of the first vent may be deeper than a depth of the second vent.

The first vent may satisfy the following conditional inequality 1:

$$8.5\% < \frac{(t-d_1)}{t} < 25\%, \quad \langle\text{conditional inequality 1}\rangle$$

where d1 represents the depth of the first vent and t represent a thickness of the can.

A maximum depth of the second vent may be about 0.5 times the depth of the first vent.

The depth of the first vent satisfies the following conditional inequality 2:

$$0.03\ \text{mm} < t-d_1 < 0.07\ \text{mm}, \quad \langle\text{conditional inequality 2}\rangle$$

where d1 represents the depth of the first vent and t represents a thickness of the can.

The first vent may be in the lower portion of the first side surface and may be on one side of the first side surface adjacent to the third side surface. The second vent may be in the upper portion of the second side surface and may be on one side of the second side surface adjacent to the fourth side surface.

The first vent and the second vent may each be in a form of a recess. A depth of the first vent may be deeper than a depth of the second vent.

The can may be formed of a metallic material.

BRIEF DESCRIPTION OF THE DRAWINGS

Features will become apparent to those of ordinary skill in the art by describing in detail exemplary embodiments with reference to the attached drawings in which.

These and/or other aspects will become apparent and more readily appreciated from the following description of the embodiments, taken in conjunction with the accompanying drawings of which.

DETAILED DESCRIPTION

Figure 1:
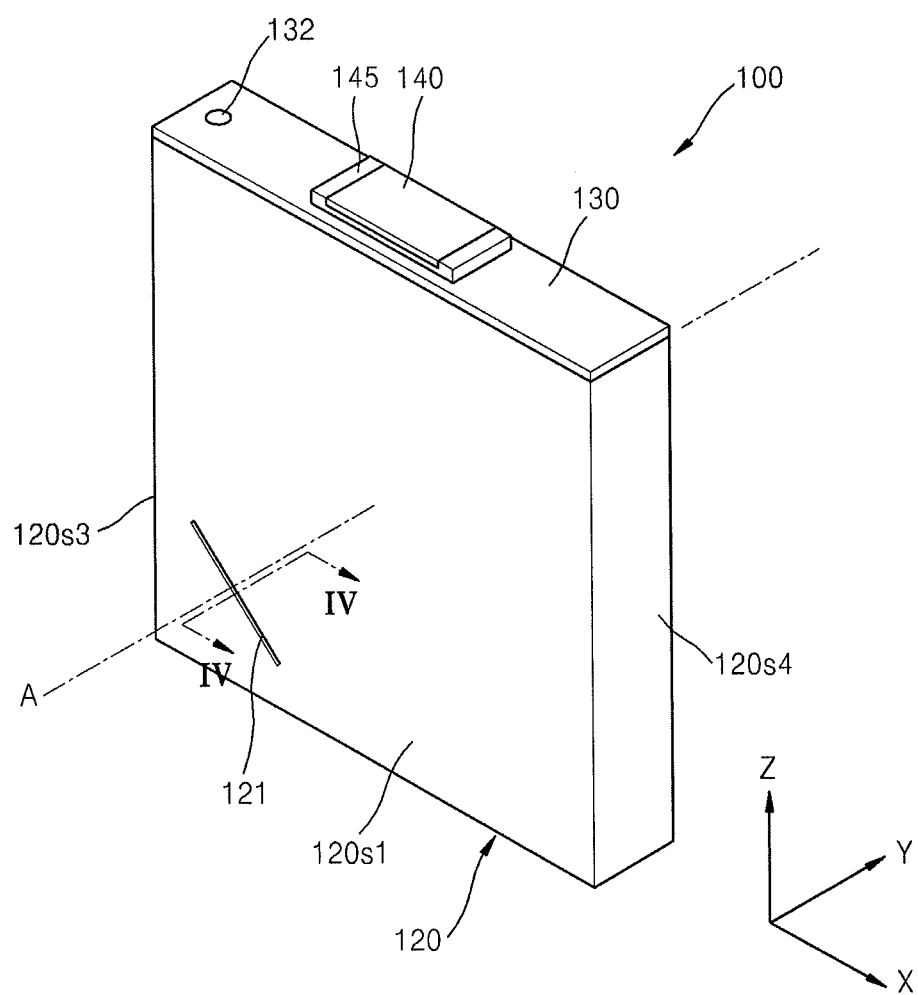
FIG. 1 illustrates a perspective view showing a rechargeable battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list. The terms of 1st, 2nd, etc., may be used to describe various components, but components should not be limited by the terms. The terms are only used to distinguish one component from the other components. Singular expression includes the expression of the plural, unless the context clearly indicates otherwise. In the present application, the term of "including" or "having" must be understood not to preclude one or more other features, numbers, steps, operations, elements, or components, which are described in the specification, or existence of a combination of these things or the additional possibility, but to specify the presence of such features, numbers, steps, operations, elements, components, or any combination of them. On the other hand, to use of "/" may be interpreted as "and" and may be interpreted as "or" on a case-by-case basis.

Figure 2:
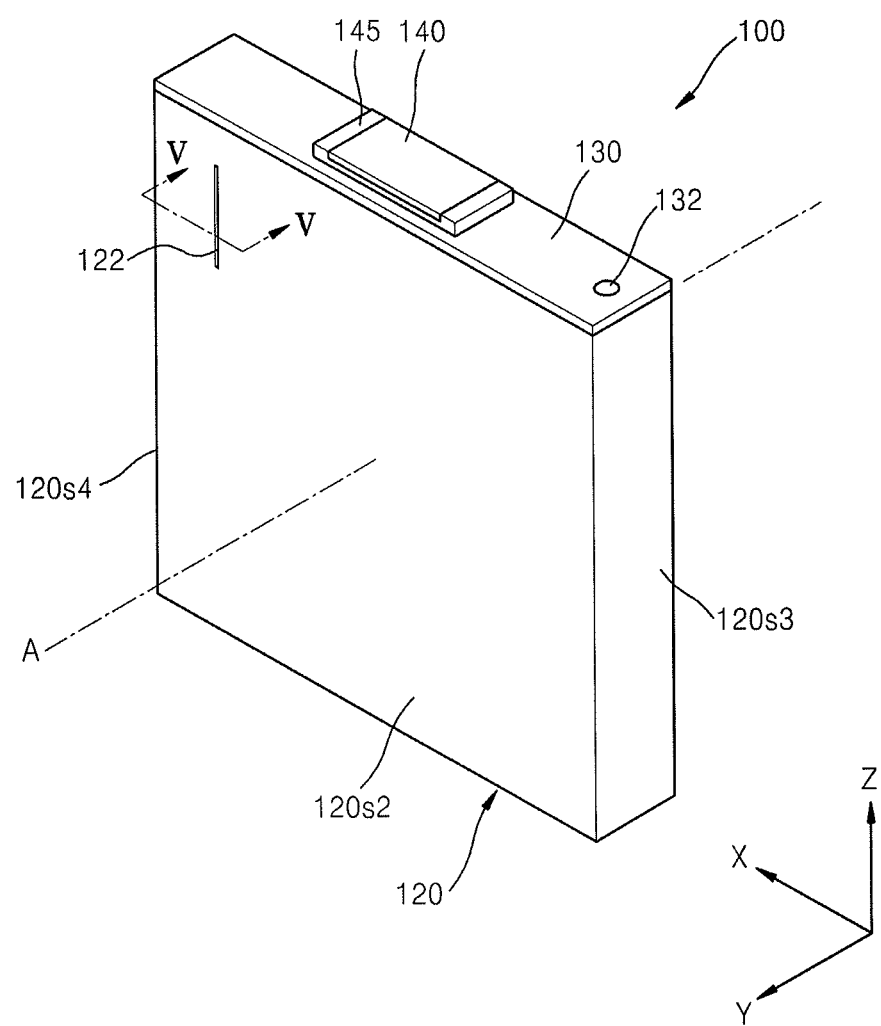
FIG. 2 illustrates a perspective view showing the rechargeable battery of FIG. 1 when viewed at a different angle.
Figure 3:
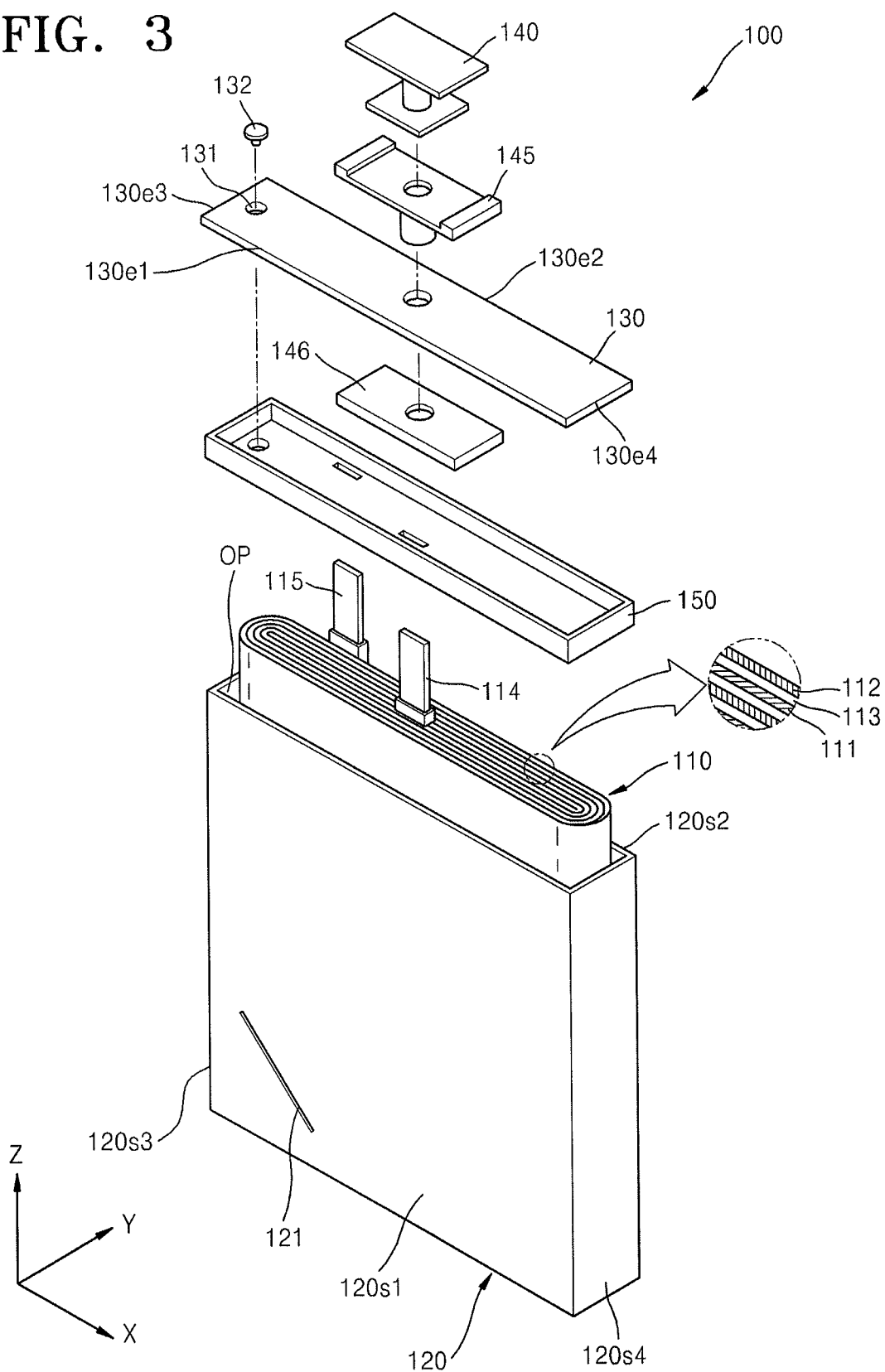
FIG. 3 illustrates an exploded perspective view of the rechargeable battery of FIG. 1.

FIG. 1 illustrates a perspective view showing a rechargeable battery according to an embodiment, FIG. 2 illustrates a perspective view showing the rechargeable battery of FIG. 1 when viewed at different angle, and FIG. 3 is an exploded perspective view of the rechargeable battery of FIG. 1.

Referring to FIGS. 1 to 3, according to an embodiment, a rechargeable battery 100 may include an electrode assembly 110, a can 120 in which the electrode assembly 110 is accommodated, and a cap plate 130 that seals the inside of the can 120.

The electrode assembly 110 may include a first electrode plate 111 and a second electrode plate 112 that are coated with an electrode active material, and a separator 113 interposed between the first electrode plate 111 and the second electrode plate 112. The electrode assembly 110 may be manufactured by the following operations of forming a laminate body in which the first electrode plate 111, the separator 113 and the second electrode plate 112 are sequentially laminated, and winding the laminate body in the form of a jelly roll. The first electrode plate 111 and the second electrode plate 112 are respectively electrically connected to a first electrode tab 114 and a second electrode tab 115 in order to externally withdraw charges that are formed by a chemical reaction. The first electrode tab 114 and the second electrode tab 115 may extend in an identical direction. For example, the first and second electrode tabs 114 and 115 may extend towards an opening (OP) of the can 120.

The present embodiment has been described with respect to the case that the electrode assembly 110 has the form of a jelly roll. In other implementations, the electrode assembly 110 may be a laminated structure that includes the first electrode plate 111, the second electrode plate 112, and the separator 113, which is interposed between the first electrode plate 111 and the second electrode plate 112.

The can 120 may be formed into a substantially rectangular parallelepiped shape, and one surface of the can 120, for example, a surface that corresponds to the upper surface, may be opened. The opened upper surface of the can 120 may be closed by the substantial rectangular cap plate 130, which has first and second longer side portions 130e1 and 130e2 and first and second shorter side portions 130e3 and 130e4. For example, the can 120 may include: a first side surface 120s1, which is in parallel with the thickness direction (the "z" direction) of the cap plate 130 and extends along the "z" direction from the first longer side portion 130e1 of the cap plate 130; a second side surface 120s2, which faces the first side surface 120s1 and extends along the "z" direction from the second longer side portion 130e2 of the cap plate 130; a third side surface 120s3, which extends along the "z" direction from the first shorter side portion 130e3 of the cap plate 130; and a fourth side surface 120s4, which extends along the "z" direction from the second shorter side portion 130e4 of the cap plate 130.

The can 120 may be fabricated from a metallic material in order to ensure strength. For example, the can 120 may be fabricated from aluminum or aluminum alloys. The electrode assembly 110 impregnated with an electrolyte may be accommodated in the inside of the can 120. In order not to cause an undesired short circuit with the can 120, which is formed of a metallic material, the outer surface of the electrode assembly 110 may be accommodated in the inside of the can 120 in a state where the electrode assembly 110 is surrounded by an insulation sheet (not shown). After the electrode assembly 110 has been accommodated in the inside of the can 120, the opening (OP) may be sealed by the cap plate 130.

The cap plate 130 may seal the opening (OP) of the can 120, and thus, the inside of the can 120 may be tightly sealed. For example, the cap plate 130 may be coupled to the upper portion of the can 120 by laser welding.

An electrolyte inlet 131 may be provided in the cap plate 130. After the cap plate 130 and the can 120 are coupled, an electrolyte may be injected through the electrolyte inlet 131, and the electrolyte inlet 131 may be sealed by a stopper 132. According to another embodiment, the electrolyte inlet 131 may not be provided in the cap plate 130. In this case, before the cap plate 130 and the can 120 are integrally coupled by laser welding, the electrolyte may be injected.

An electrode terminal 140 may be disposed on top of the cap plate 130. The upper surface of the electrode terminal 140 may be exposed to the outside through the upper portion of the cap plate 130, and the lower portion thereof may penetrate the cap plate 130 to thus be directed toward the inside of the can 120.

The cap plate 130, as well as the can 120, may be also fabricated from a metallic material. The electrode terminal 140 may be electrically connected to the first electrode tab 114 of the electrode assembly 110, and thus the electrode terminal 140 may have a first polarity. The cap plate 130 may be electrically connected to the second electrode tab 115 of the electrode assembly 110, and thus the cap plate 130 may have a second polarity. For example, the cap plate 130 may serve as a positive electrode of the rechargeable battery 100 and the electrode terminal 140 may serve as a negative electrode of the rechargeable battery 100. In order to prevent a short circuit that may occur between the cap plate 130 and the electrode terminal 140, a first gasket 145 and a second gasket (not shown) that includes an insulating material may be provided.

The first gasket 145 may be disposed to contact the upper surface of the cap plate 130, and the second gasket may be disposed to contact the lower surface of the cap plate 130. The present embodiment has been described with respect to a case that the first and second gaskets are separately formed, but in other implementations, the first and second gaskets may be integrally formed. In order that the can 120, which has a second polarity due to welding of the can 120 to the cap plate 130, is electrically insulated from external objects or other rechargeable batteries 100, an insulation film (not shown) that covers the first and second side surfaces 120$s$1 and 120$s$2 of the can 120 may be attached on both sides of the can 120.

A first insulating member 150 may be disposed inside the can 120 at the upper portion of the electrode assembly 110. The first insulating member 150 may insulate the electrode assembly 110 from the cap plate 130. According to another implementation, the first insulating member 150 may insulate the electrode assembly 110 from the cap plate 130 and at the same time may regulate the movement of the electrode assembly 110 in the inside of the can 120. The first insulating member 150 may include a through hole so that the first and second electrode tabs 114 and 115 may extend towards the opening (OP). The insulating member 150 may include a hole that is formed at the position corresponding to the electrolyte inlet 131 so that the electrolyte that flows through the electrolyte inlet 131 passes through the hole. A second insulating member (not shown) may be disposed at the lower portion of the electrode assembly 110. Accordingly, an undesired short circuit between the can 120 made of a metallic material and the electrode assembly 110 may be prevented.

The first vent 121 and the second vent 122 are formed on the outer side surface of the can 120. Accordingly, it may be possible to prevent or reduce the risk of explosion of the rechargeable battery 100. If the rechargeable battery 100 operates abnormally, gas buildup may occur in the inside of the rechargeable battery 100. While the internal gas applies pressure on the inner wall of the can 120, a swelling phenomenon may occur in which the rechargeable battery 100, that is, the can 120, is expanded. In this case, the first vent 121 and/or the second vent 122 may be ruptured by the gas buildup that has occurred during an abnormal operation. Accordingly, the gas may be emitted to the outside, thus preventing or reducing the risk of explosion of the rechargeable battery 100.

The swelling phenomenon in which the rechargeable battery 100 is expanded may appear most prominently in the central areas of the first and second side surfaces 120$s$1 and 120$s$2, whose mechanical strengths are relatively weak. In general, the can 120 of the rechargeable battery 100 expands the most along the direction of an axis (A), which passes through the centers of the first and second side surfaces. The extent of expansion may form a generally concentric shape around the axis (A). However, if the rechargeable battery 100 expands unevenly according to the internal structure of the rechargeable battery 100, the occurrence location of the gas may be uneven. If a vent is located on a surface that does not experience as much swelling from gas buildup, the vent may not rupture. In such as case, the rechargeable battery 100 may explode despite the existence of a vent. In order to prevent or reduce the risk of such explosion, the first and second vents 121 and 122 may be disposed at different positions on different surfaces. For example, the first vent 121 may be formed at the lower portion of the first side surface 120$s$1, and the second vent 122 may be formed at the upper portion of the second side surface 120$s$2. When at least one of the first and second vents 121 and 122, which are formed at different locations on different surfaces, is ruptured, the internal gas of the rechargeable battery 100 is emitted, and explosion of the rechargeable battery 100 may be prevented.

Figure 4:
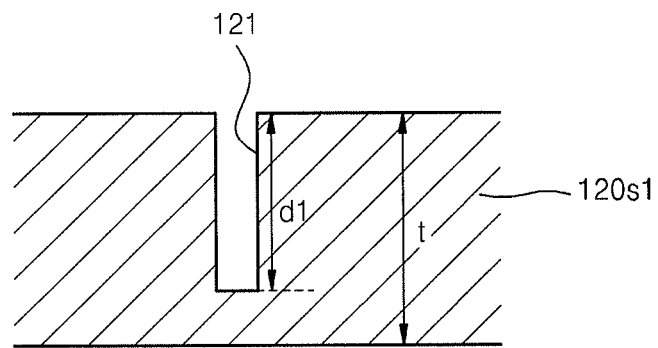
FIG. 4 illustrates a cross-sectional view which is taken along line IV-IV of FIG. 1.
Figure 5:
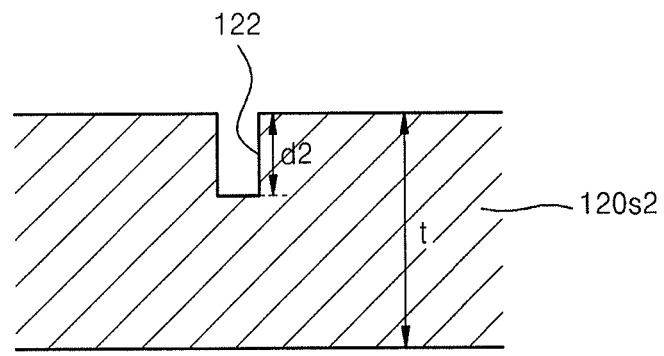
FIG. 5 illustrates a cross-sectional view which is taken along line V-V of FIG. 2.

FIGS. 4 and 5 illustrate lateral cross-sections of the first and second vents 121 and 122, respectively, in which FIG. 4 illustrates a cross-sectional view that is taken along line IV-IV of FIG. 1, and FIG. 5 illustrates a cross-sectional view that is taken along line V-V of FIG. 2.

Referring to FIGS. 4 and 5, the first vent 121 and the second vent 122 may be respectively formed on outer surfaces of the can 120, in the form of a groove. The respective depths d1 and d2 of the first vent 121 and the second vent 122 are less than the thickness t1 of the can 120.

The upper portion of the can 120 forms the opening (OP) and is welded to the cap plate 130. Accordingly, the strength of the upper portion of the can 120 may be relatively weaker than the strength of the lower portion thereof. Thus, the depth d2 of the second vent 122 may be formed to be shallower than the depth d1 of the first vent 121. For example, the depths of the first and second vents 121 and 122 may be formed to be deep enough so as to not obstruct the original functions of the first and second vents 121 and 122 that prevent or reduce the risk of explosion of the rechargeable battery 100. For example, the maximum value of the depth d2 of the second vent 122 may be about 0.5 times the depth d1 of the first vent 121. In the case that the depth d2 of the second vent 122 were to be greater than 0.5 times the depth d1 of the first vent 121, the second vent 122 could be easily ruptured even when the internal pressure of the rechargeable battery 100 is low, and could be ruptured due to shock that may occur during welding of the cap plate 130 and the can 120. Therefore, an operational stability of the rechargeable battery 100 may be degraded.

The depth d1 of the first vent 121 may satisfy the following conditional inequality 1 with regard to the thickness "t" of the can 120.

$$8.5\% < \frac{(t-d_1)}{t} < 25\%, \qquad \langle\text{conditional inequality 1}\rangle$$

In the case that the value of $$\frac{(t-d_1)}{t}$$

is less than the lowermost limit of the above <conditional inequality 1>, the first vent 121 may be easily ruptured, even when the internal pressure of the rechargeable battery 100 is low. Therefore, the operational stability of the rechargeable battery 100 may be degraded. On the other hand, in the case that the value of $$\frac{(t-d_1)}{t}$$

is greater than the uppermost limit of the above <conditional inequality 1>, even when the internal pressure of the rechargeable battery 100 is high, the first vent 121 may not be ruptured, which could eventually lead to the explosion of the rechargeable battery 100.

According to an embodiment, the depth d1 of the first vent 121 and the thickness "t" of the can 120 may satisfy the following conditional inequality 2.

$$0.03 \text{ mm} < t - d_1 < 0.07 \text{ mm} \qquad \text{<conditional inequality 2>}$$

Figure 6:
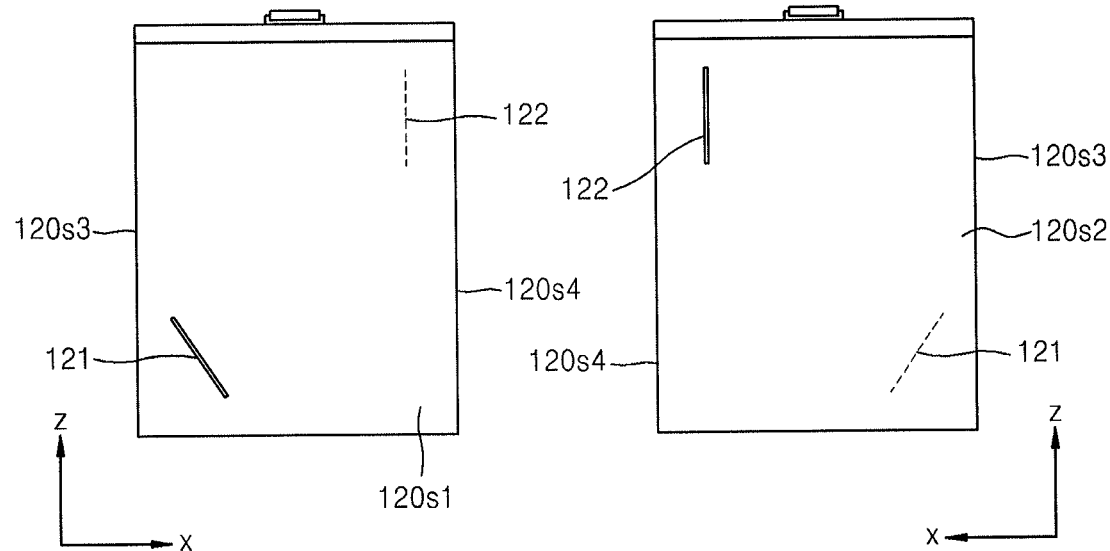
FIGS. 6 to 9 represent a first side surface and a second side surface, which include a first vent and a second vent, according to various embodiments.
Figure 7:
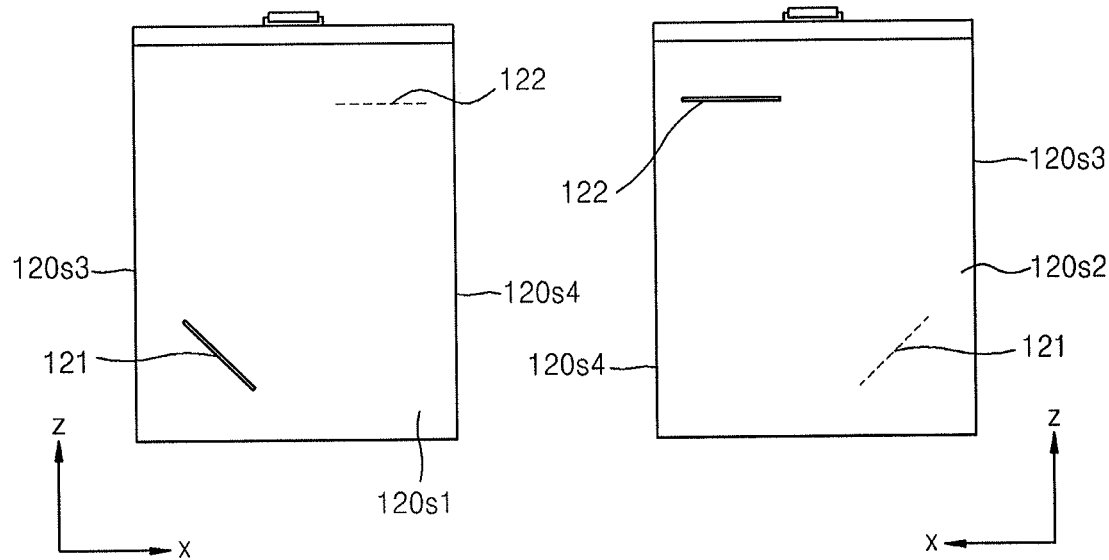
Figure 8:
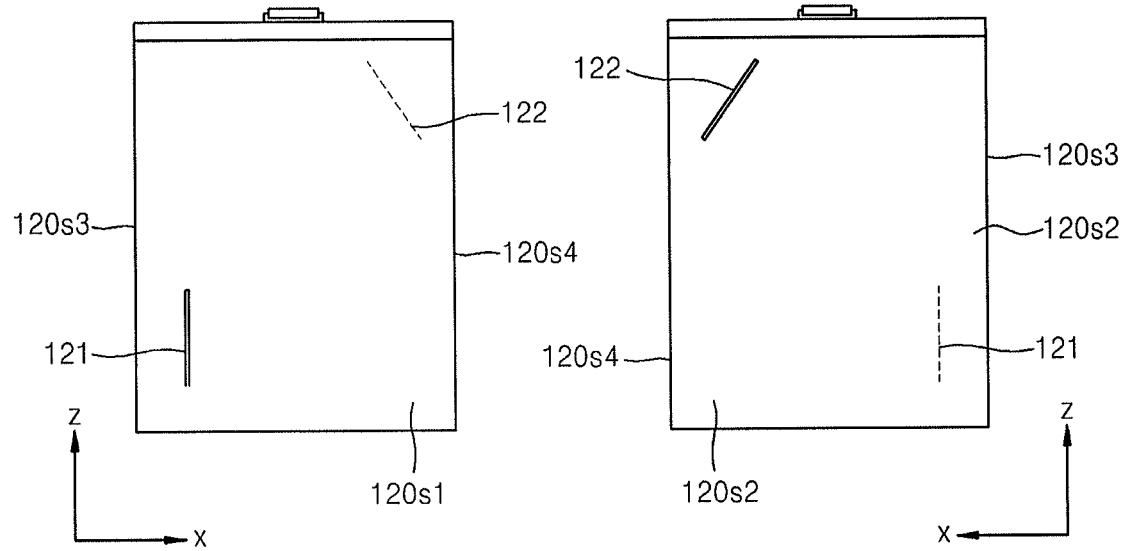
Figure 9:
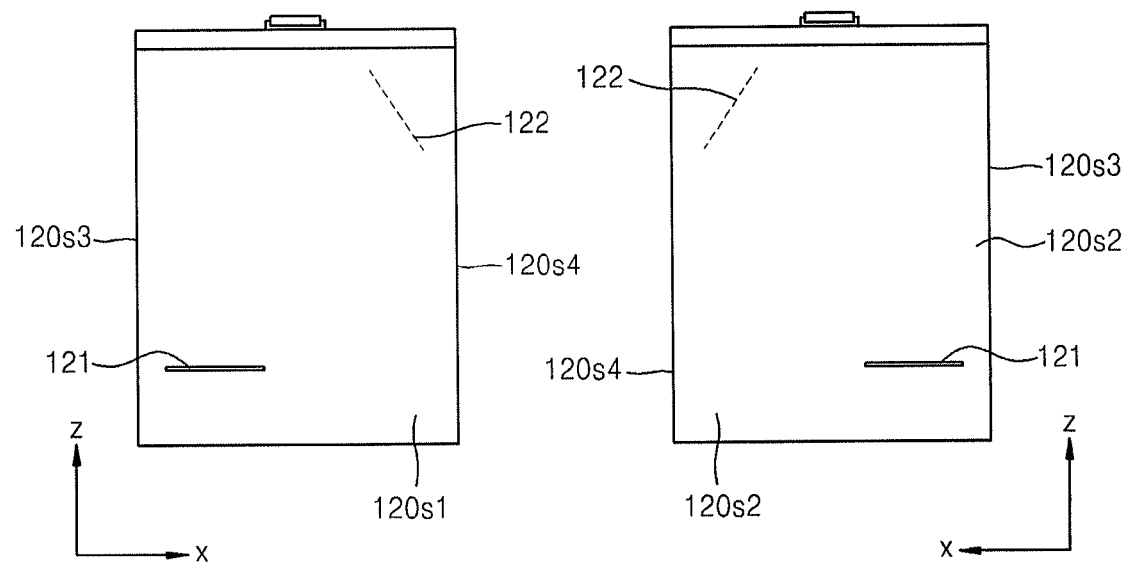

FIG. 6 represents a first side surface and a second side surface of the rechargeable battery that are respectively shown in FIGS. 1 and 2. FIGS. 7 to 9 represent the first and second side surfaces according to other embodiments. A vent, when formed on an opposite side surface, is shown in FIGS. 6 to 9 as a dotted line.

Referring to FIGS. 6 to 9, the first and second vents 121 and 122 may be disposed away from each other, so that even if the rechargeable battery 100 expands unevenly, the first and second vents 121 and 122 may be easily ruptured in the case that the pressure inside of the rechargeable battery 100 is greater than a predetermined pressure.

For example, the first vent 121 may be formed in the lower-left portion (or the lower-right portion) of the first side surface 120s1, and the second vent 122 may be formed in the upper-right portion (or the upper-left portion) of the second side surface 120s2. The first vent 121 may be formed at the lower portion of the first side surface 120s1, and may be disposed in an adjacent area to the third side surface 120s3 on the first side surface 120s1. The second vent 122 may be formed at the upper portion of the second side surface 120s2, and may be disposed in an adjacent area to the fourth side surface 120s4 on the second side surface 120s2.

The first and second vents 121 and 122 may extend along different directions, respectively. For example, as shown in FIG. 6, the first vent 121 may extend along an oblique direction with respect to the thickness direction (the "z" direction) of the cap plate 130, and the second vent 122 may extend along a parallel direction to the "z" direction.

According to another embodiment, as shown in FIG. 7, the first vent 121 may extend along an oblique direction with respect to the thickness direction (the "z" direction) of the cap plate 130, and the second vent 122 may extend along a perpendicular direction (the "x" direction) to the "z" direction.

According to another embodiment, as shown in FIG. 8, the first vent 121 may extend along a parallel direction to the thickness direction (the "z" direction) of the cap plate 130, and the second vent 122 may extend along an oblique direction with respect to the "z" direction.

According to another embodiment, as shown in FIG. 9, the first vent 121 may extend along a perpendicular direction (the "x" direction) to the thickness direction (the "z" direction) of the cap plate 130, and the second vent 122 may extend along an oblique direction with respect to the "z" direction.

As mentioned above, the first and second vents 121 and 122 may extend in different directions. Accordingly, even if the rechargeable battery 100 expands unevenly, the first and second vents 121 and 122 may be configured so that at least one thereof may be ruptured in the case that the pressure inside of the rechargeable battery 100 is greater than a predetermined pressure.

By way of summation and review, rechargeable batteries are being used in a variety of fields. Accordingly, reliability tests according to the use environment of the rechargeable batteries are becoming an important issue. Typical items for the reliability tests include temperature durability, drop strength, electrostatic discharge (ESD), charging and discharging tests, etc. Rechargeable batteries may be used for an extended period of time through charging and discharging. Accordingly, the operating stability of the rechargeable batteries may be an important factor.

Embodiments provide a structure of a rechargeable battery having vents, in order to prevent explosion due to abnormal operations. Embodiments provide first and second vents formed on different surfaces of a can of a rechargeable battery, and/or at different locations, and/or at different depths. Accordingly, even if the rechargeable battery expands unevenly in an abnormal condition, any one of the first and second vents may be easily ruptured if an internal pressure of the rechargeable battery is higher than a reference pressure. Therefore, the rechargeable battery may be prevented from exploding.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A rechargeable battery, comprising:
    an electrode assembly including a first electrode plate, a second electrode plate, and a separator between the first electrode plate and the second electrode plate;
    a can having an opening at one side thereof through which the electrode assembly is inserted, the electrode assembly being accommodated in the inside of the can; and
    a cap plate that seals the opening of the can, the can including:
  a first vent having a first recess on a lower portion of a first side surface of the can; and
  a second vent having a second recess on an upper portion of a second side surface of the can, wherein:
    the second vent is closer to the cap plate than the first vent, and
    a depth of the first recess of the first vent is deeper than a depth of the second recess of the second vent.

2. The rechargeable battery as claimed in claim 1, wherein the first vent satisfies a following conditional inequality 1:

$$8.5\% < \frac{(t-d_1)}{t} < 25\%, \qquad \langle\text{conditional inequality 1}\rangle$$

where d1 represents the depth of the first vent, and t represents a thickness of the can.

3. The rechargeable battery as claimed in claim 1, wherein a maximum depth of the second vent is about 0.5 times the depth of the first vent.

4. The rechargeable battery as claimed in claim 1, wherein the depth of the first vent satisfies a following conditional inequality 2:

$$0.03 \text{ mm} < t-d_1 < 0.07 \text{ mm}, \qquad <\text{conditional inequality 2}>$$

where d1 represents the depth of the first vent, and t represents a thickness of the can.

5. The rechargeable battery as claimed in claim 1, wherein:
  any one of the first vent and the second vent extends along an oblique direction with respect to a thickness direction of the cap plate, and
  another one of the first vent and the second vent extends parallel to the thickness direction of the cap plate or extends along a perpendicular direction with respect to the thickness direction of the cap plate.

6. A rechargeable battery, comprising:
  an electrode assembly including a first electrode plate, a second electrode plate, and a separator between the first electrode plate and the second electrode plate;
  a can formed of a metallic material and having an opening at one side thereof through which the electrode assembly is inserted, the electrode assembly being accommodated inside the can; and
  a cap plate that is welded to the can to seal the opening of the can,
  the can including:
    a first vent having a first recess on a lower portion of a first side surface of the can; and
    a second vent having a second recess on an upper portion of a second side surface of the can, wherein:
      the second vent is closer to the cap plate than the first vent, and
      a depth of the first recess of the first vent is deeper than a depth of the second recess of the second vent.

7. A rechargeable battery, comprising:
  an electrode assembly including a first electrode plate, a second electrode plate, and a separator between the first electrode plate and the second electrode plate;
  a can having an opening at one side thereof through which the electrode assembly is inserted, the electrode assembly being accommodated inside the can; and
  a cap plate that seals the opening of the can,
  wherein the can includes:
    a first side surface and a second side surface that extend in a thickness direction of the cap plate from a longer side portion of the cap plate, the first side surface and the second side surface facing in opposite directions from each other;
    a third side surface and a fourth side surface extend along the thickness direction of the cap plate from a shorter side portion of the cap plate, the third side surface and the fourth side surface facing in opposite directions from each other;
    a first vent having a first recess on a lower portion of the first side surface; and
    a second vent having a second recess on an upper portion of the second side surface, wherein:
      the second vent is closer to the cap plate than the first vent, and
      a depth of the first recess of the first vent is deeper than a depth of the second recess of the second vent.

8. The rechargeable battery as claimed in claim 7, wherein
  the first vent is on one side of the lower portion of the first side surface, and
  the second vent is on one side of the upper portion of the second side surface.

9. The rechargeable battery as claimed in claim 8, wherein:
  any one of the first vent and the second vent extends along an oblique direction with respect to the thickness direction of the cap plate, and
  another one of the first vent and the second vent extends parallel to the thickness direction of the cap plate or extends along a perpendicular direction with respect to the thickness direction of the cap plate.

10. The rechargeable battery as claimed in claim 7, wherein the first vent satisfies a following conditional inequality 1:

$$8.5\% < \frac{(t-d_1)}{t} < 25\%, \qquad \langle\text{conditional inequality 1}\rangle$$

where d1 represents the depth of the first vent, and t represent a thickness of the can.

11. The rechargeable battery as claimed in claim 10, wherein a maximum depth of the second vent is about 0.5 times the depth of the first vent.

12. The rechargeable battery as claimed in claim 10, wherein the depth of the first vent satisfies a following conditional inequality 2:

$$0.03 \text{ mm} < t-d_1 < 0.07 \text{ mm}, \qquad <\text{conditional inequality 2}>$$

where d1 represents the depth of the first vent, and t represents a thickness of the can.

13. The rechargeable battery as claimed in claim 7, wherein:
  the first vent is in the lower portion of the first side surface and is on one side of the first side surface adjacent to the third side surface, and
  the second vent is in the upper portion of the second side surface and is on one side of the second side surface adjacent to the fourth side surface.

14. The rechargeable battery as claimed in claim 7, wherein the can is formed of a metallic material.

15. The rechargeable battery as claimed in claim 1, wherein the first side surface of the can and the second side surface of the can are located on opposite sides of the rechargeable battery from each other.

16. The rechargeable battery as claimed in claim 6, wherein the second side surface of the can is on an opposite side from the first side surface of the can.

\* \* \* \* \*